(12) United States Patent
Christensen et al.

(10) Patent No.: US 9,457,754 B1
(45) Date of Patent: Oct. 4, 2016

(54) METHOD AND SYSTEM FOR IDENTIFYING VEHICLE COLLISIONS USING SENSOR DATA

(71) Applicant: STATE FARM MUTUAL AUTOMOBILE INSURANCE COMPANY, Bloomington, IL (US)

(72) Inventors: Scott T. Christensen, Salem, OR (US); David J. Dosher, Bloomington, IL (US); Sunish S. Menon, Normal, IL (US); Susan M. Dunham, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 7 days.

(21) Appl. No.: 14/797,496

(22) Filed: Jul. 13, 2015

(51) Int. Cl.
*B60R 21/0136* (2006.01)
*B60Q 1/52* (2006.01)
*B60R 21/00* (2006.01)
*B60W 40/08* (2012.01)

(52) U.S. Cl.
CPC .......... *B60R 21/0136* (2013.01); *B60Q 1/525* (2013.01); *B60R 2021/0027* (2013.01); *B60W 2040/0818* (2013.01)

(58) Field of Classification Search
CPC .......... B60R 2021/0027; B60R 21/0136; B60Q 1/525; B60K 28/06; B60K 28/02; B60K 28/066; B60W 2040/0818; B60W 2040/0827; B60W 2040/0836; B60W 2040/0845; B60W 40/08; B60W 40/09; B60W 2050/0089; B60W 2050/0064; G08B 21/00; G08B 21/02; G08B 21/18; G07C 5/008; G07C 5/00; G07C 5/08; G07C 5/0841; G07C 5/085; G07C 5/0858; G07C 5/0866; G07C 5/0891
See application file for complete search history.

(56) References Cited

U.S. PATENT DOCUMENTS

| | | | |
|---|---|---|---|
| 5,418,722 A * | 5/1995 | Cashler | B60R 21/0132 180/282 |
| 8,954,226 B1 | 2/2015 | Binion et al. | |
| 8,972,100 B2 | 3/2015 | Mullen et al. | |
| 2007/0013496 A1 * | 1/2007 | Miura | B60R 21/0132 340/435 |
| 2010/0142715 A1 * | 6/2010 | Goldstein | H04R 1/1083 381/56 |
| 2012/0146766 A1 * | 6/2012 | Geisler | G07C 5/008 340/8.1 |
| 2014/0082713 A1 * | 3/2014 | Markel | H04L 63/08 726/7 |
| 2015/0112730 A1 | 4/2015 | Binion et al. | |

OTHER PUBLICATIONS

U.S. Appl. No. 14/713,330, filed Mar. 15, 2015.

* cited by examiner

*Primary Examiner* — Abby Lin
(74) *Attorney, Agent, or Firm* — Marshall, Gerstein & Borun LLP; Randall G. Rueth

(57) ABSTRACT

A method and system may identify vehicle collisions in real-time or at least near real-time based on statistical data collected from previous vehicle collisions. A user's portable computing device may obtain sensor data from sensors in the portable computing device and compare the sensor data to a statistical model indicative of a vehicle collision. If the portable computing device identifies a vehicle collision based on the comparison, notifications may be sent to emergency contacts and/or emergency personnel to provide assistance to the user.

18 Claims, 8 Drawing Sheets

US 9,457,754 B1

METHOD AND SYSTEM FOR IDENTIFYING VEHICLE COLLISIONS USING SENSOR DATA

TECHNICAL FIELD

The present disclosure generally relates to identifying vehicle collisions and, more particularly identifying vehicle collisions in near real-time by analyzing sensor data from a portable computing device and comparing the sensor data to statistical models indicative of vehicle collisions.

BACKGROUND

Today, vehicle collisions may be identified by drivers, passengers, and witnesses who see or are involved in the collision. However, such collisions may not be identified and reported in real-time, because the drivers, passengers, and witnesses involved in the collision may be incapacitated or unwilling to report the collision. Moreover, an assessment of a vehicle collision may be performed after the collision occurs, and may be based on vehicle damage reports and/or police reports.

SUMMARY

To automatically identify a vehicle collision in near real-time, a collision identification system may obtain sensor data at a portable computing device within a vehicle. For example, the sensor data may include the position, speed, acceleration, pressure, sound intensity and/or rotation of the portable computing device. The sensor data may be analyzed according to a statistical model which is indicative of a vehicle collision. Based on the analysis, the collision identification system may determine whether a vehicle collision has occurred.

In this manner, emergency notifications may be transmitted in near real-time, so that emergency personnel may respond as quickly as possible. Moreover, by identifying vehicle collisions via a portable computing device, collisions may be detected for any vehicle in an efficient manner and a user may have a single device for detecting collisions involving each of her vehicles. Also, sensor data may be collected from several portable computing devices of the driver and/or passengers in the vehicle. Advantageously, vehicle collisions may be identified with increased accuracy by comparing the sensor data collected at each of the portable computing devices.

In an embodiment, a computer-implemented method for automatically identifying vehicle collisions using sensor data is provided. The method includes obtaining sensor data from one or more sensors communicatively coupled to a portable computing device, wherein a user of the portable computing device is travelling in a vehicle. The method further includes obtaining statistical data indicative of a vehicle collision including one or more sensor data characteristics which correspond to the vehicle collision, comparing the obtained sensor data from the one or more sensors to the statistical data indicative of the vehicle collision, and determining that a collision has occurred involving the vehicle based on the comparison.

In another embodiment, a portable computing device for automatically identifying vehicle collisions using sensor data is provided. The portable computing device includes one or more processors, one or more sensors for receiving sensor data including at least one of: acceleration data, speed data, position data, or rotation data, and a non-transitory computer-readable memory coupled to the one or more processors, and the one or more sensors and storing instructions thereon. When executed by the one or more processors, the instructions cause the portable computing device to obtain the sensor data from the one or more sensors, wherein a user of the portable computing device is travelling in a vehicle, obtain statistical data indicative of a vehicle collision including one or more sensor data characteristics which correspond to the vehicle collision, compare the obtained sensor data from the one or more sensors to the statistical data indicative of the vehicle collision, and determine that a collision has occurred involving the vehicle based on the comparison.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
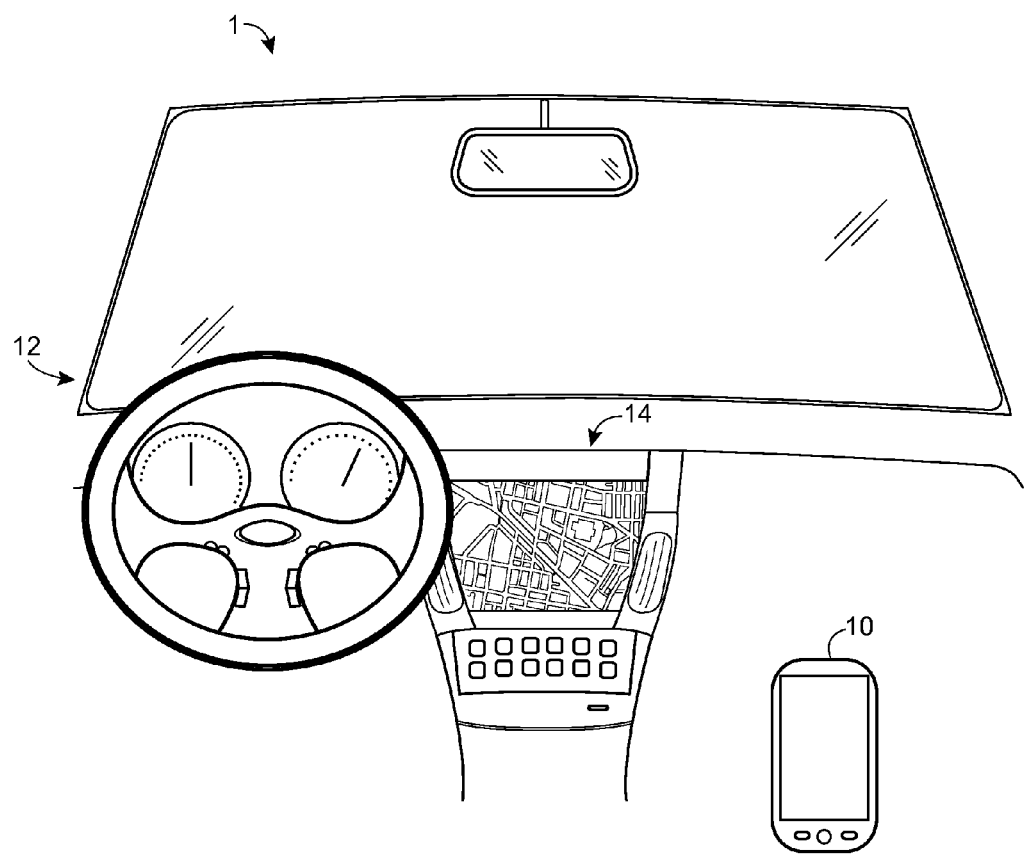
FIG. 1 illustrates an example vehicle in which the techniques of the present disclosure can be used to identify vehicle collisions.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Accordingly, as used herein, the term "vehicle" may refer to any of a number of motorized transportation devices. A vehicle may be a car, truck, bus, train, boat, plane, motorcycle, snowmobile, other personal transport devices, etc. As used herein, a "vehicle trip" means one use of a vehicle to travel from a departure location to a destination location. The departure and destination locations may be the same location, such as where a user travels from a departure location to a third point and then travels back to the departure location in the vehicle. The departure and destination locations may alternatively be different locations, such as where a user travels from a departure location to a different destination location in the vehicle. A vehicle trip may include one or more stops along the route of the vehicle between the departure location and the destination location.

The term "real-time" as used herein, may be used to refer to information delivered within a predetermined amount of time after it is collected (e.g., seconds, minutes, hours, etc.). For example, a vehicle collision which is identified within a short period of time after the vehicle collision occurs may be identified in "real-time." The term "near real-time" as used herein, may be used to refer to information delivered within a predetermined amount of time after real-time. For example, a vehicle collision may be detected in "near real-time" when there is a processing delay between the time the vehicle collision occurs and the time the vehicle collision is detected (e.g., one minute, five minutes, twenty minutes, an hour, etc.).

Generally speaking, techniques for identifying vehicle collisions may be implemented in one or several portable computing devices, one or several network servers or a system that includes a combination of these devices. However, for clarity, the examples below focus primarily on an embodiment in which a collision identification server generates and transmits statistical models to a user's portable computing device. The statistical models may be used to identify real-time or at least near real-time vehicle collisions based on sensor data from previous vehicle collisions. Additionally, the portable computing device may obtain sensor data from various sensors within the portable computing device such as position data, speed data, acceleration data, rotation data, pressure data, sound data, etc., and may compare the obtained sensor data to the statistical models to determine whether a collision has occurred. Moreover, the portable computing device may transmit notifications to emergency personnel and/or to selected contacts in the user's contact list upon identifying a vehicle collision.

Referring to FIG. 1, an example environment 1 in which the techniques outlined above can be implemented includes a portable computing device 10 and a vehicle 12 with a head unit 14. The portable computing device 10 may include, by way of example, various types of "mobile devices," such as a tablet computer, a cell phone, a personal digital assistant (PDA), a smart-phone, a laptop computer, a desktop computer, a portable media player, a home phone, a pager, a wearable computing device, smart glasses, smart watches or bracelets, phablets, other smart devices, devices configured for wired or wireless RF (Radio Frequency) communication, etc. Additionally, any portable computing device appropriately configured may interact with the collision identification system.

Moreover, while the example environment 1 includes one portable computing device 10, any number of portable computing devices may be included in the example environment 1 such that two or more portable computing devices may communicate with each other and/or with a collision identification server to accurately identify vehicle collisions. For example, a first portable computing device, such as a first passenger's smart-phone may communicate with a second portable computing device, such as a second passenger's smart phone to compare sensor data and/or to determine whether a vehicle collision is identified at both devices, one of the devices, or none of the devices. By comparing sensor data and/or determining which of the devices identifies a vehicle collision, the collision identification system may be able to detect the occurrence of a false positive or a false negative in one of the devices.

In any event, the portable computing device 10 may communicate with the head unit 14 of the vehicle 12 (vehicle head unit) via a communication link, which may be wired (e.g., Universal Serial Bus (USB)) or wireless (e.g., Bluetooth, Wi-Fi Direct). The portable computing device 10 also can communicate with various content providers, servers, etc., via a wireless communication network such as a fourth- or third-generation cellular network (4G or 3G, respectively), a Wi-Fi network (802.11 standards), a WiMAX network, a wide area network (WAN), a local area network (LAN), etc.

In some instances, the portable computing device 10 may communicate with the wireless communication network via wireless signals and, in some instances, may communicate with the wireless communication network via an intervening wireless or wired device, which may be a wireless router, a wireless repeater, a base transceiver station of a mobile telephony provider, etc.

An example implementation of the portable computing device 10 and a collision identification server 102 is discussed next with reference to FIG. 2A. The collision identification server 102 and the portable computing device 10 may be communicatively connected through a network 130, as described below. According to embodiments, the collision identification server 102 may be a combination of hardware and software components, also as described in more detail below.

The portable computing device 10 may interact with the collision identification server 102 to receive web pages and/or server data and may display the web pages and/or server data via a client application and/or an Internet browser (described below). For example, the collision identification server 102 may display an application screen of a client application and/or a web page to a user, may receive an input from the user, may receive sensor data from the portable computing device 10, and/or may generate and transmit statistical models indicative of vehicle collisions.

It will be appreciated that although only one collision identification server 102 is depicted in FIG. 1, multiple servers 102 may be provided for the purpose of distributing server load, serving different web pages, etc. These multiple servers 102 may include a web server, an entity-specific server (e.g. an Apple® server, etc.), a server that is disposed in a retail or proprietary network, etc.

The collision identification server 102 may communicate with the portable computing device 10 via the network 130. The digital network 130 may be a proprietary network, a secure public Internet, a virtual private network and/or some other type of network, such as dedicated access lines, plain ordinary telephone lines, satellite links, combinations of these, etc. Where the digital network 130 comprises the Internet, data communication may take place over the digital network 130 via an Internet communication protocol.

The collision identification server 102 may include a controller 224. The controller 224 may include a program memory 226, a microcontroller or a microprocessor (MP) 228, a random-access memory (RAM) 230, and/or an input/output (I/O) circuit 234, all of which may be interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as sensor data from previous vehicle collisions or other sensor data collected at a portable computing device during a vehicle trip, web page templates and/or web pages, and other data necessary to interact with users through the network 130.

Figure 2A:
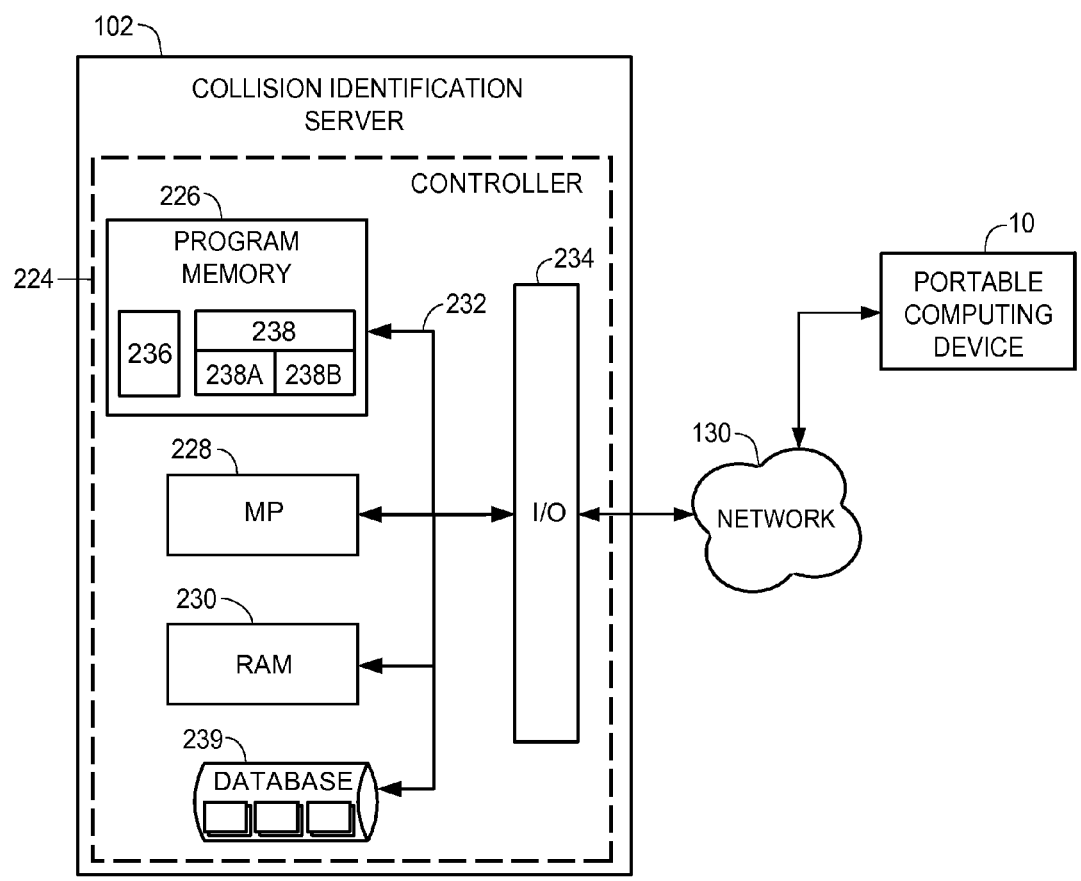
FIG. 2A illustrates a block diagram of an exemplary server device that can operate in the system of FIG. 1.

It should be appreciated that although FIG. 2A depicts only one microprocessor 228, the controller 224 may include multiple microprocessors 228. Similarly, the memory of the controller 224 may include multiple RAMs 230 and/or multiple program memories 226. Although FIG. 2A depicts the I/O circuit 234 as a single block, the I/O circuit 234 may include a number of different types of I/O circuits. The controller 224 may implement the RAM(s) 230 and/or the program memories 226 as semiconductor memories, magnetically readable memories, and/or optically readable memories, for example.

As shown in FIG. 2A, the program memory 226 and/or the RAM 230 may store various applications for execution by the microprocessor 228. For example, a user-interface application 236 may provide a user interface to the collision identification server 102, which user interface may, for example, allow the system administrator to configure, troubleshoot, and/or test various aspects of the server's operation, such as the statistical models. A server application 238 may operate to generate and/or transmit statistical models for identifying vehicle collisions to the portable computing device 10. The server application 238 may be a single module such as a training module as described in more detail below in FIG. 3 or a plurality of modules 238A, 238B.

While the server application 238 is depicted in FIG. 2A as including two modules, 238A and 238B, the server application 238 may include any number of modules accomplishing tasks related to implementation of the collision identification server 102.

In any event, to generate a statistical model indicative of a vehicle collision, the training module, during a training period, may obtain several sets of sensor data from portable computing devices collected during vehicle trips. In some embodiments, some of the sets of sensor data may correspond to vehicle trips which involved vehicle collisions while other sets of sensor data may correspond to vehicle trips which did not involve vehicle collisions. By utilizing sets of sensor data from previous vehicle collisions, the present embodiments may create an accurate statistical model for identifying vehicle collisions. The training module may analyze each of the sensor data sets to identify characteristics for each sensor data set and distinguish between the characteristics of the sensor data sets that correspond to vehicle collisions and characteristics of the sensor data sets that do not correspond to vehicle collisions.

For example, in some embodiments, the training module may generate a set of rules which include thresholds for distinguishing between sensor data indicative of a vehicle collision and sensor data which does not indicate a vehicle collision (e.g., a threshold acceleration (measured in g-forces) above four G may indicate a vehicle collision). In other embodiments, the training module may analyze the sensor data and generate a statistical model for identifying vehicle collisions using any other machine learning techniques. In yet other embodiments, a user such as a system administrator may input a set of rules or any other type of statistical model based on the sensor data.

The statistical model generated by the training module and/or the user, may be compared to additional sets of sensor data during a testing phase to determine whether a set of sensor data corresponds to a vehicle collision. If the training module makes the correct determination more frequently than a predetermined threshold amount, the statistical model may be provided to a portable computing device 10 for identifying vehicle collisions in real-time or at least near real-time. On the other hand, if the training module does not make the correct determination more frequently than the predetermined threshold amount, the training module may continue to obtain and analyze additional sets of sensor data for further training.

In some embodiments, the training module may continue to receive sensor data after the statistical model is provided to the portable computing device 10 to add updates to the statistical model. When the statistical model is updated, for example after a predetermined time interval and/or after a significant change to the statistical model (e.g., a threshold acceleration changes from four G to five G), the updated statistical model may be provided to the portable computing device 10. Advantageously, by updating the statistical model, the collision identification system may continue to improve its accuracy in identifying vehicle collisions with time.

Figure 2B:
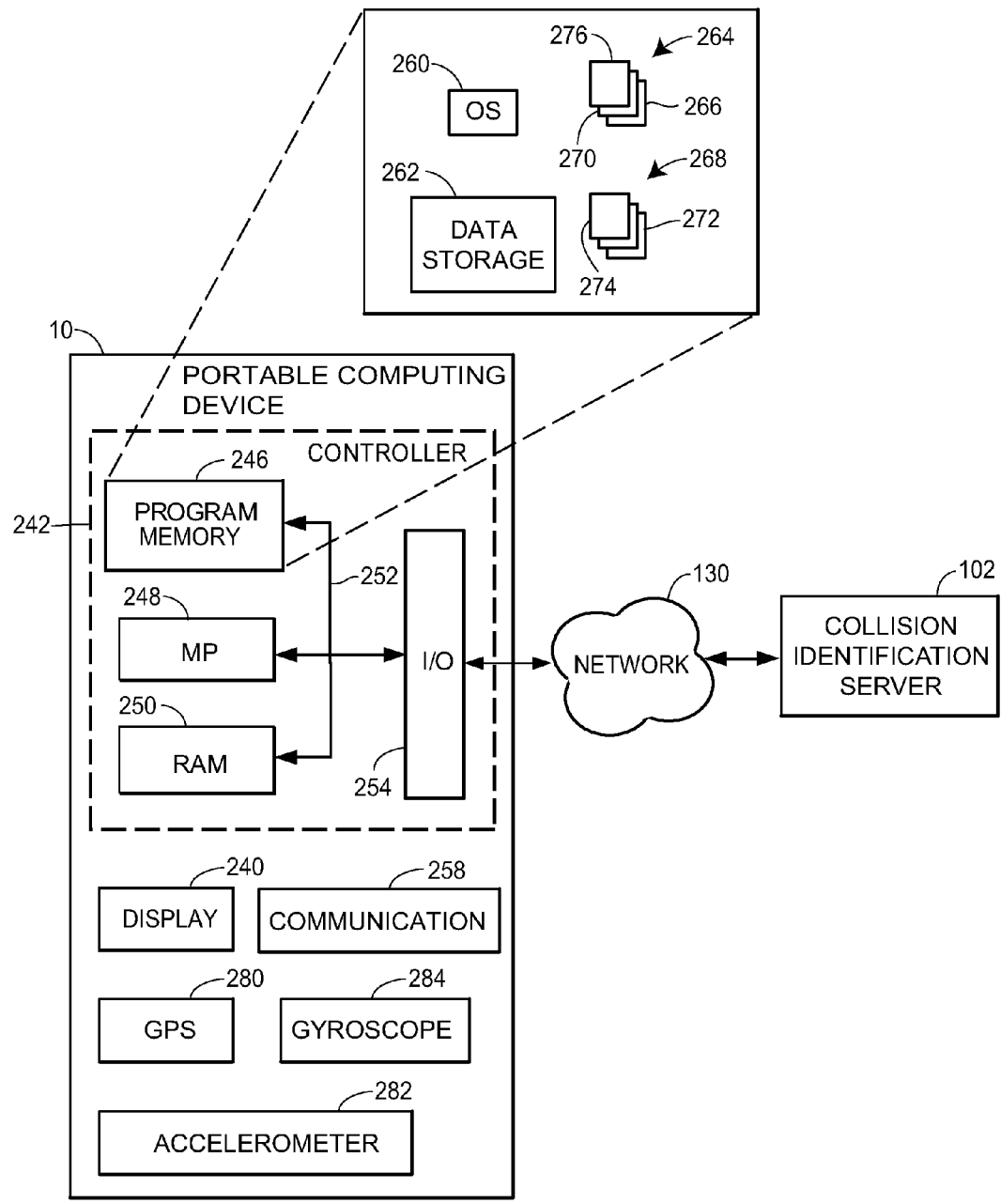
FIG. 2B illustrates a block diagram of an exemplary client device that can operate in the system of FIG. 1.

Referring now to FIG. 2B, the portable computing device 10 may include a display 240, a Global Positioning System (GPS) unit 280, an accelerometer 282 to measure the acceleration of the portable computing device 10, a gyroscope 284 to measure the rotation of the portable computing device 10, a communication unit 258, a user-input device (not shown), and, like the collision identification server 102, a controller 242. In some embodiments, the portable computing device 10 may also include a barometer to measure the change in pressure, for example, from the airbags, and a microphone to measure sound intensity, such as a high volume sound corresponding to a vehicle collision. Similar to the controller 224, the controller 242 may include a program memory 246, a microcontroller or a microprocessor (MP) 248, a random-access memory (RAM) 250, and/or an input/output (I/O) circuit 254, all of which may be interconnected via an address/data bus 252. The program memory 246 may include an operating system 260, a data storage 262, a plurality of software applications 264, and/or a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

The data storage 262 may include data such as user profiles, application data for the plurality of applications 264, routine data for the plurality of routines 268, and/or other data necessary to interact with the collision identification server 102 through the digital network 130. In some embodiments, the controller 242 may also include, or otherwise be communicatively connected to, other data storage mechanisms (e.g., one or more hard disk drives, optical storage drives, solid state storage devices, etc.) that reside within the portable computing device 10.

The GPS unit 280 may use "Assisted GPS" (A-GPS), satellite GPS, or any other suitable global positioning protocol or system that locates the position of the portable computing device 10. For example, A-GPS utilizes terrestrial cell phone towers or Wi-Fi hotspots (e.g., wireless router points) to more accurately and more quickly determine the location of the portable computing device 10 while satellite GPS generally are more useful in more remote regions that lack cell towers or Wi-Fi hotspots.

The accelerometer 282 may monitor and/or measure the acceleration of the portable computing device 10 along several axes. For example, acceleration may be measured along the X, Y, and/or Z axes. In some embodiments, the X-axis may be oriented along a front-back axis aligned with the portable computing device 10, the Y-axis may be oriented along a side-side axis aligned with the portable computing device 10, and the Z-axis may be oriented along a top-bottom axis aligned with the portable computing device 10. However, these axes may be positioned in other ways.

Also, the gyroscope 284 may monitor and/or measure the rotation of the portable computing device 10 around several axes. For example, the gyroscope 284 may measure the change in roll, pitch, and yaw, which may be measured around the X-axis, Y-axis, and Z-axis, respectively. In some embodiments, the rotation may be measured using a combination of sensors, such as the accelerometer 282 and the gyroscope 284, or any other suitable combination of sensors.

The communication unit 258 may communicate with the collision identification server 102 via any suitable wireless communication protocol network, such as a wireless telephony network (e.g., GSM, CDMA, LTE, etc.), a Wi-Fi network (802.11 standards), a WiMAX network, a Bluetooth network, etc. The user-input device (not shown) may include a "soft" keyboard that is displayed on the display 240 of the portable computing device 10, an external hardware keyboard communicating via a wired or a wireless connection (e.g., a Bluetooth keyboard), an external mouse, or any other suitable user-input device. As discussed with reference to the controller 224, it should be appreciated that although FIG. 2B depicts only one microprocessor 248, the controller 242 may include multiple microprocessors 248. Similarly, the memory of the controller 242 may include multiple RAMs 250 and/or multiple program memories 246. Although the FIG. 2B depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and/or transmitting information from the portable computing device 10.

One of the plurality of applications 264 may be a native application and/or web browser 270, such as Apple's Safari®, Google Chrome™, Microsoft Internet Explorer®, and Mozilla Firefox® that may be implemented as a series of machine-readable instructions for receiving, interpreting, and/or displaying web page information from the collision identification server 102 while also receiving inputs from the user. Another application of the plurality of applications may include an embedded web browser 276 that may be implemented as a series of machine-readable instructions for receiving, interpreting, and/or displaying web page information from the collision identification server 102.

One of the plurality of routines may include a collision identification routine 272 which for example, may be implemented by a collision assessment module as described in more detail below in FIG. 4. The collision identification routine 272 may obtain sensor data from the GPS unit 280, the accelerometer 282, the gyroscope 284, the barometer, and the microphone, obtain a statistical model from the collision identification server 102, and determine the likelihood of a vehicle collision. Another routine in the plurality of routines may include a collision notification routine 274 that obtains an indication that a vehicle collision has occurred, displays collision information on the user interface 240, such as collision tips, emergency contact information, crash verification, etc., and/or transmits emergency notifications to emergency personnel.

Preferably, a user may launch the client application 266 from the portable computing device 10, to communicate with the collision identification server 102 to implement the collision identification system. Additionally, the user may also launch or instantiate any other suitable user interface application (e.g., the native application or web browser 270, or any other one of the plurality of software applications 264) to access the collision identification server 102 to realize the collision identification system.

Figure 3:
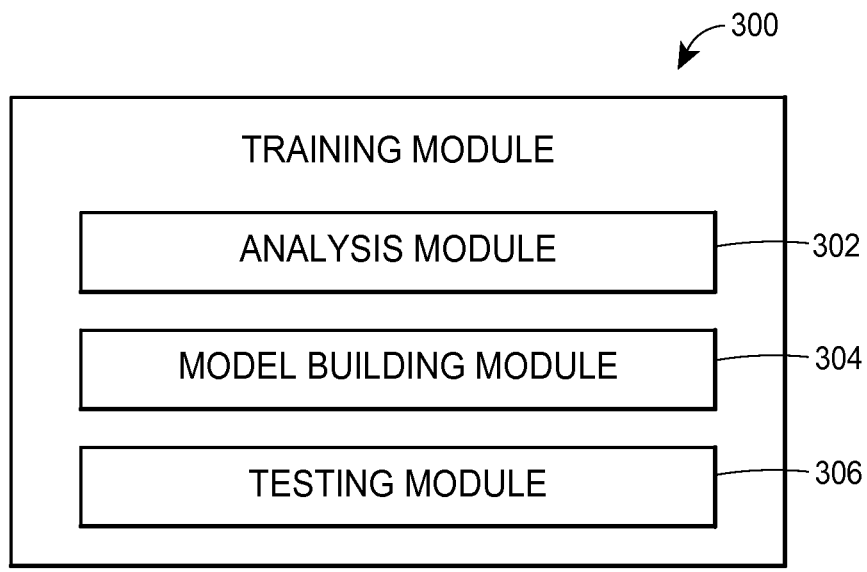
FIG. 3 illustrates a block diagram of an exemplary embodiment of a training module.

FIG. 3 is an exemplary block diagram of a training module 300 which may be included in the collision identification server 102. In other embodiments, the training module 300 may be included in the portable computing device 10 and/or a combination of these devices. The training module 300 may include an analysis module 302, a model building module 304, and a testing module 306. During a training period, the training module 300 may obtain sets of sensor data from portable computing devices and/or from any other suitable devices during vehicle trips. Each set of sensor data may be collected at a device periodically throughout the vehicle trip (e.g., after predetermined time intervals, such as every two minutes, every five minutes, every ten minutes, etc.) or may be collected in any other suitable manner. Moreover, the portable computing device may collect the set of sensor data for a predetermined duration (e.g., for 30 seconds, for 45 seconds, etc.), at a certain sample rate.

For example, position data, speed data, acceleration data, rotation data, pressure data, and/or sound data may be collected at a sample rate of 10 times per second (10 Hz), 20 times per second (20 Hz), 50 times per second (50 Hz), 100 times per second (100 Hz), etc., for the predetermined duration. In some embodiments, each type of sensor data may be collected at a different sample rate. Each set of sensor data may include an indication of whether the set of sensor data corresponds to a vehicle collision. For example, if the set of sensor data is collected within a predetermined time interval of a vehicle collision (e.g., within 30 seconds before or 30 seconds after the vehicle collision), the set of sensor data may include an indication that a vehicle collision occurred.

The analysis module 302 may then receive each set of sensor data which may be training data and may perform a statistical analysis on the sensor data for sets of sensor data which correspond to a vehicle collision and for sets of sensor data which do not correspond to a vehicle collision. For example, for a set of sensor data, the analysis module 302 may generate statistical data such as a sample rate at which the set of sensor data is collected, a maximum acceleration for the set of sensor data, a second highest acceleration for the set of sensor data, a maximum change in speed (e.g., in a one second interval) for the set of sensor data, a speed before the collision, a speed after the collision, an average acceleration for the set of sensor data, a standard deviation for the change in speed, a maximum rotation for the set of sensor data, a maximum change in pressure for the set of sensor data, a maximum sound intensity for the set of sensor data, etc. As used herein, the acceleration, change in speed, change in pressure, and/or rotation may be absolute values of the acceleration, change in speed, change in pressure, and/or rotation, such that for example, a maximum acceleration may be the highest absolute value of acceleration whether it is a positive or negative acceleration. The maximum change in speed may be the highest absolute value of the change in speed which may be an increase or a decrease in speed.

The analysis module 302 may provide the statistical data and the training data to the model building module 304, which may generate a statistical model. In some embodiments, the statistical model may be a decision tree and/or set of rules including sensor data thresholds for identifying vehicle collisions. The statistical model may be generated according to various machine learning techniques, such as naïve Bayes, random forests, boosting, decision trees, logistic regression, k-nearest neighbors, etc.

For example, using the various machine learning techniques, the model building module 304 may identify characteristics of the sensor data sets (sensor data characteristics) that correspond to a vehicle collision which are distinguishable from sensor data sets that do not correspond to a vehicle collision.

In an exemplary scenario, the model building module 304 may determine based on the training data, that when a set of sensor data has a maximum acceleration above six G and a sample rate of 10 Hz, there is a 90 percent likelihood that the set of sensor data corresponds to a vehicle collision. The model building module 304 may also determine that when the sample rate is 20 Hz and the maximum acceleration is above eight G, there is a 95 percent likelihood the set of sensor data corresponds to a vehicle collision. Moreover, in another example, the model building module 304 may determine, based on the training data, that when the maximum acceleration is between four and six G and a second acceleration within the set of sensor data is greater than three G, that there is a 99 percent likelihood the set of sensor data corresponds to a vehicle collision. In yet another example, the model building module 304 may determine there is a high likelihood of a vehicle collision when the maximum acceleration is between two and four G and the maximum change in speed is above a predetermined threshold, such as 25 miles per hour (mph).

As a result, the model building module 304 may generate a set of rules for identifying a vehicle collision according to these sensor data characteristics. For example, for a set of sensor data, the set of rules may specify a threshold acceleration when the sample rate is within a threshold sample rate range, and a threshold change in speed. When the maximum acceleration in the set of sensor data is greater than a threshold acceleration, a first acceleration score may be assigned to the set of sensor data, and when the maximum acceleration is less than the threshold acceleration, a second acceleration score lower than the first acceleration score may be assigned to the set of sensor data.

Additionally, the set of rules may specify a threshold change in speed, such that when the maximum change in speed in the set of sensor data is greater than the threshold change in speed, a first speed score may be assigned to the set of sensor data, and when the maximum change in speed is less than the threshold change in speed, a second speed score lower than the first speed score may be assigned to the set of sensor data. The acceleration score and the speed score may be aggregated and/or combined in any suitable manner, such as by adding the scores, multiplying the scores, averaging the scores, assigning a weight to each score and adding or multiplying the weighted scores, taking a weighted average of the scores, etc.

In any event, the scores may be combined/aggregated to generate an overall collision likelihood score which may be compared to a threshold collision score determined based on the identified sensor data characteristics. For example, the model building module 304 may determine a threshold collision score of 100, because 99 percent of sensor data sets having collision scores above 100 correspond to a vehicle collision. The set of rules may indicate a vehicle collision when the overall collision likelihood score for a set of sensor data exceeds the threshold collision score. In other embodiments, the set of rules may include additional thresholds and/or scores such as a threshold rotation and a rotation score, a threshold change in pressure and a pressure score, and/or a threshold sound intensity and a sound intensity score, each of which may be combined/aggregated with the acceleration and speed scores to generate an overall collision likelihood score. In other embodiments, any suitable number of the acceleration score, speed score, rotation score, pressure score, and sound intensity score may be combined/aggregated in any suitable manner to generate an overall collision score. While assigning and combining/aggregating scores based on whether sensor data exceeds thresholds may be one example of a set of rules for identifying a vehicle collision, the model building module 304 may generate any suitable set of rules for identifying vehicle collisions.

In some embodiments, the model building module 304 may adjust the statistical model for sets of sensor data having large spikes in acceleration, speed, pressure, sound intensity, and/or rotation which do not correspond to vehicle collisions, so as to avoid false positives. For example, the model building module 304 may receive sets of sensor data corresponding to the portable computing device 10 being dropped, thrown, flipped, etc. As a result, the model building module 304 may adjust the thresholds so as to exceed the maximum accelerations, speeds, pressures, sound intensities, rotations, etc., for these sets of sensor data. However, if adjusting the thresholds causes false negatives, the model building module 304 may adjust the statistical model in any other suitable manner. For example, the model building module 304 may generate additional rules, such as a second threshold acceleration for a second highest acceleration in the set of sensor data, an average threshold acceleration for the average acceleration over the duration in which the set of sensor data is collected, or a threshold speed before and/or after the maximum acceleration is detected (e.g., if the speed is zero or another constant speed before and/or after the increase in acceleration, the portable computing device 10 may be likely to have been dropped, thrown, or flipped). Also, if the rotation data for the portable computing device 10 indicates that the portable computing device 10 has made a half or complete rotation, the set of rules may specify a threshold acceleration which may be used to distinguish between the vehicle flipping and the portable computing device 10 being flipped while the vehicle remains upright.

In another example, the model building module 304 may generate a decision tree based on the training data. For example, the decision tree may contain several branches each corresponding to a different threshold sample rate range. Each branch may be connected to a node having a threshold acceleration, which in turn has two branches including a first branch that may be followed when the maximum acceleration is less than the threshold acceleration and a second branch that may be followed when the maximum acceleration is greater than the maximum acceleration. At least some of these branches may then be connected to leaf nodes which may indicate a probability that a vehicle collision has occurred and/or may indicate whether or not the set of sensor data corresponds to a vehicle collision.

In addition to identifying whether a vehicle collision occurred, the statistical model or another statistical model may be generated by the model building module 304 to identify a type and/or severity of the collision or a likelihood that the identified type and/or severity of the collision occurred. For example, the statistical model may be used to identify whether the type of collision is a single vehicle collision, such as a collision between the vehicle and a pole, a tree, a barrier, an animal, a pedestrian, etc., a high-speed collision, a low-speed collision, a rear-end collision, a side-impact collision, a head-on collision, a sideswipe collision, a vehicle rollover, or any other type of vehicle collision. Moreover, the statistical model may be used to identify a severity level of the collision, such as a "High," "Medium," or "Low" severity level.

For example, the severity level may be determined by assigning a severity score to the vehicle collision based on the corresponding set of sensor data. Each severity level may correspond to a threshold severity score range, such as a severity score above 90 corresponding to the "High" severity level, a severity score between 30 and 90 corresponding to the "Medium" severity level, and a severity score below 30 corresponding to the "Low" severity level. The type and/or severity of the collision may be determined using the same or similar machine learning techniques as the machine learning techniques used for generating the statistical model for identifying vehicle collisions.

In other embodiments, a user such as a system administrator may input a statistical model to the model building module 304 based on the training data. In any event, the statistical model may be provided to the testing module 306 which may utilize the statistical model to determine whether "test" sets of sensor data may correspond to a vehicle collision. The "test" sets of sensor data may be sets of sensor data received at times when the status of the corresponding vehicle trip is known (e.g., a vehicle collision occurred during the vehicle trip or no vehicle collisions occurred during the vehicle trip). However, for purposes of testing, the testing module 306 may identify whether a vehicle collision has occurred or a likelihood that a vehicle collision has occurred by comparing the "test" sets of sensor data to the statistical model generated by the model building module 304 and/or the user. The identification may be compared to the known vehicle trip status.

Figure 4:
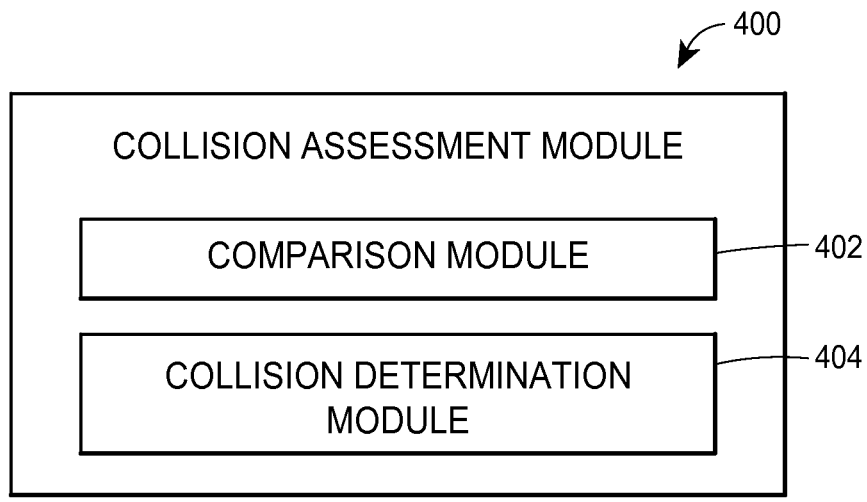
FIG. 4 illustrates a block diagram of an exemplary embodiment of a collision assessment module.

In some embodiments, when the testing module 306 is correct more than a predetermined threshold amount of the time (e.g., by correctly identifying whether or not a vehicle collision occurred or by correctly identifying a likelihood above a predetermined threshold, such as 95 percent), the statistical model may be provided to the portable computing device 10 and/or a collision assessment module 400 in the portable computing device 10 or the collision identification server 102, as described in more detail below with reference to FIG. 4. The collision assessment module 400 may then compare the statistical model to sets of sensor data when the status of the corresponding vehicle trip is unknown to identify vehicle collisions in real-time or at least near real-time. On the other hand, if the testing module 306 is not correct more than the predetermined threshold amount, the training module 300 may continue obtaining sets of sensor from when the statuses of the corresponding vehicle trips are known for further training.

Once the statistical model has been adequately tested to verify its accuracy, the statistical model may be provided to the collision assessment module 400. FIG. 4 is an exemplary block diagram of a collision assessment module 400 which may be included in the portable computing device 10 to identify vehicle collisions. In other embodiments, the collision assessment module 400 may be included in the collision identification server 102 and/or a combination of these devices. In any event, the collision assessment module 400 may include a comparison module 402 and/or a collision determination module 404. The comparison module 402 may obtain a current set of sensor data in real-time or at least near real-time when the status of the corresponding vehicle trip is unknown. For example, the comparison module may obtain position data from the GPS unit 280, speed data from the GPS unit 280, acceleration data from the accelerometer 282, a sample rate at which the acceleration is measured from the accelerometer 282, rotation data from the gyroscope 284, pressure data from the barometer, sound data from the microphone, and/or additional sensor data from any other sensors in the portable computing device 10. In some embodiments, the sensor data may be obtained from any suitable combination of sensors in the portable computing device 10. For example, rotation data may be obtained from a combination of the accelerometer 282 and the gyroscope 284. The current set of sensor data may be obtained for a predetermined duration (e.g., for 30 seconds, for 45 seconds, etc.) after predetermined time intervals, such as every two minutes, every five minutes, every ten minutes, etc.

Then the comparison module 402 may compare the current set of sensor data to the statistical model generated by the model building module 304. For example, the comparison module 402 may obtain a maximum acceleration, a sample rate at which the acceleration is measured, a maximum change in speed, a maximum rotation, a maximum change in pressure, a maximum sound intensity, and additional accelerations, changes in speed, rotations, changes in pressure, sound intensities, etc., collected during the predetermined duration. In some embodiments, the comparison module 402 may determine a likelihood that current set of sensor data corresponds to a vehicle collision based on the comparison. The likelihood may be represented as a probability (e.g., 0.6), a percentage (e.g., 80 percent), a category from a set of categories (e.g., "High," "Medium," or "Low"), or in any other suitable manner.

For example, if the statistical model is a decision tree with each leaf node of the decision tree indicating a likelihood of a vehicle collision, the comparison module 402 may follow the branches of the decision tree which correspond to the current set of sensor data until reaching a leaf node. In particular, in another exemplary scenario, the current set of sensor data may include a maximum acceleration of five G, a sample rate of 50 Hz, and a maximum change in speed of 40 mph. The decision tree may include a branch for sample rates within a sample rate range of 30-60 Hz, followed by a branch for when the maximum acceleration is less than six G, followed by a branch for when the maximum change in speed is greater than 30 mph, followed by a leaf node indicating a likelihood of a vehicle collision of 95 percent. The comparison module 402 may follow each of these branches which correspond to the current set of sensor data, and as a result, may determine a likelihood of 95 percent.

The collision determination module 404 may receive the likelihood of a vehicle collision, and compare the received likelihood to a predetermined likelihood threshold (e.g., 90 percent). If the received likelihood is greater than the predetermined likelihood threshold, the collision determination module 404 may identify a vehicle collision based on the current set of sensor data. On the other hand, if the received likelihood does not exceed the predetermined likelihood threshold, the collision determination module 404 may not identify a vehicle collision, and the collision assessment module 400 may continue to receive current sets of sensor data after predetermined time intervals. In some embodiments, the comparison module 402 may also compare the current set of sensor data to the statistical model for identifying the type and/or severity of the collision, and the collision determination module 404 may determine the type and/or severity based on the comparison.

In some embodiments, the collision assessment module 400 may obtain several current sets of sensor data from several portable computing devices within the vehicle. For example, the collision assessment module 400 may obtain a first current set of sensor data from a driver's portable computing device 10 which includes the collision assessment module 400. Additionally, the collision assessment module 400 may obtain second, third, fourth, etc., current sets of sensor data from passengers' portable computing devices within the vehicle. The driver's portable computing device 10 may communicate with the passengers' portable computing devices via a short-range communication link, such as Bluetooth, Wi-Fi Direct, ZigBee, Near Field Communication (NFC), etc. In other embodiments, passengers' portable computing devices may transmit current sets of sensor data to the collision identification server 102. The driver's portable computing device 10 may detect the presence of other nearby portable computing devices via a Wi-Fi Direct signal, Bluetooth signal, ZigBee signal, etc., and may retrieve the passengers' current sets of sensor data from the collision identification server 102.

In any event, the collision assessment module 400 may then combine the current sets of sensor data in any suitable manner and may compare the combined sets of sensor data to the statistical model to identify a vehicle collision. In some embodiments, the maximum acceleration may be the highest acceleration in all of the current sets of sensor data, or may be an average of the maximum accelerations for each of the current sets of sensor data. Also, in some embodiments, the statistical data in each of the current sets of sensor data may be weighted for example, such that the current set of sensor data for the portable computing device which includes the collision assessment module 400 may be weighted more heavily than the other current sets of sensor data. In other embodiments, each of the current sets of sensor data may be weighted equally.

In yet other embodiments, the driver's portable computing device 10 may determine whether a vehicle collision occurred and/or a likelihood of a vehicle collision based on the current set of sensor data obtained at sensors in the portable computing device 10, as described above. The passengers' portable computing devices may also determine whether a vehicle collision occurred and/or a likelihood of a vehicle collision, and may transmit their determinations and/or likelihoods to the driver's portable computing device 10 via the short-range communication link, or via the collision identification server 102. The driver's portable computing device 10 may then reassess the determination of whether a vehicle collision occurred, based on the determinations and/or likelihoods from the passengers' portable computing devices.

In some embodiments, the driver's portable computing device 10 may identify a vehicle collision when more than a threshold amount of the portable computing devices (e.g., 70 percent) determine that a vehicle collision occurred. For example, if the driver's portable computing device 10 determines that a vehicle collision occurred, one passenger's portable computing device also determines that a vehicle collision occurred, and two passenger's portable computing devices determine that a vehicle collision did not occur, the driver's portable computing device 10 may reassess its determination and may not identify a vehicle collision.

In other embodiments, the vehicle collision likelihoods from each of the portable computing devices may be combined, aggregated, averaged, and/or weighted in any suitable manner to generate a collective vehicle collision likelihood. The collective vehicle collision likelihood may be compared to a predetermined likelihood threshold (e.g., 90 percent), and if the collective vehicle collision likelihood is greater than the predetermined likelihood threshold, the collision assessment module 400 may identify a vehicle collision based on the current sets of sensor data from the driver's and the passengers' portable computing devices.

In any event, when a vehicle collision is identified, an emergency notification may automatically be transmitted to a user's emergency contacts. For example, upon initializing the client application 266 the user may input emergency contacts via a crash alert display, as described in more detail below in FIG. 5A. The emergency notification may be transmitted via email, short message service (SMS) text message, phone call, etc., using the contact information specified by the user. Furthermore, an additional emergency notification may be transmitted to emergency personnel such as a police department, a fire department, paramedics, etc. In some embodiments, the additional emergency notification may be transmitted to emergency personnel when the user is nonresponsive to an alert by the portable computing device 10 via a crash verification display, as described in more detail below in FIG. 5B. The additional emergency notification may also be transmitted when the user indicates she needs emergency assistance in response to the alert, when the severity of the vehicle collision is above a threshold severity level (as determined by the collision assessment module 400), or in any other suitable manner.

In addition to transmitting an emergency notification, an alert may be displayed to the user via the crash verification display. For example, the alert may include a user control for indicating whether a vehicle collision actually occurred. If the user indicates that a vehicle collision did not occur, the current set of sensor data may be transmitted to the training module 300 for further training, with an indication that the current set of sensor data does not correspond to a vehicle collision.

On the other hand, if the user indicates that a vehicle collision did occur or if the user does not respond to the alert, the user may receive a phone call asking whether the user requires emergency assistance. If the user indicates that she needs emergency assistance or does not answer the phone call, an emergency notification may be transmitted to the emergency personnel. Otherwise, if the user indicates that she does not need emergency assistance, the user may receive tips on how to proceed after the collision via a crash advice display, as described in more detail below in FIG. 5C. In any event, the current set of sensor data may be transmitted to the training module 300 for further training, with an indication that the current set of sensor data corresponds to a vehicle collision.

Figure 5A:
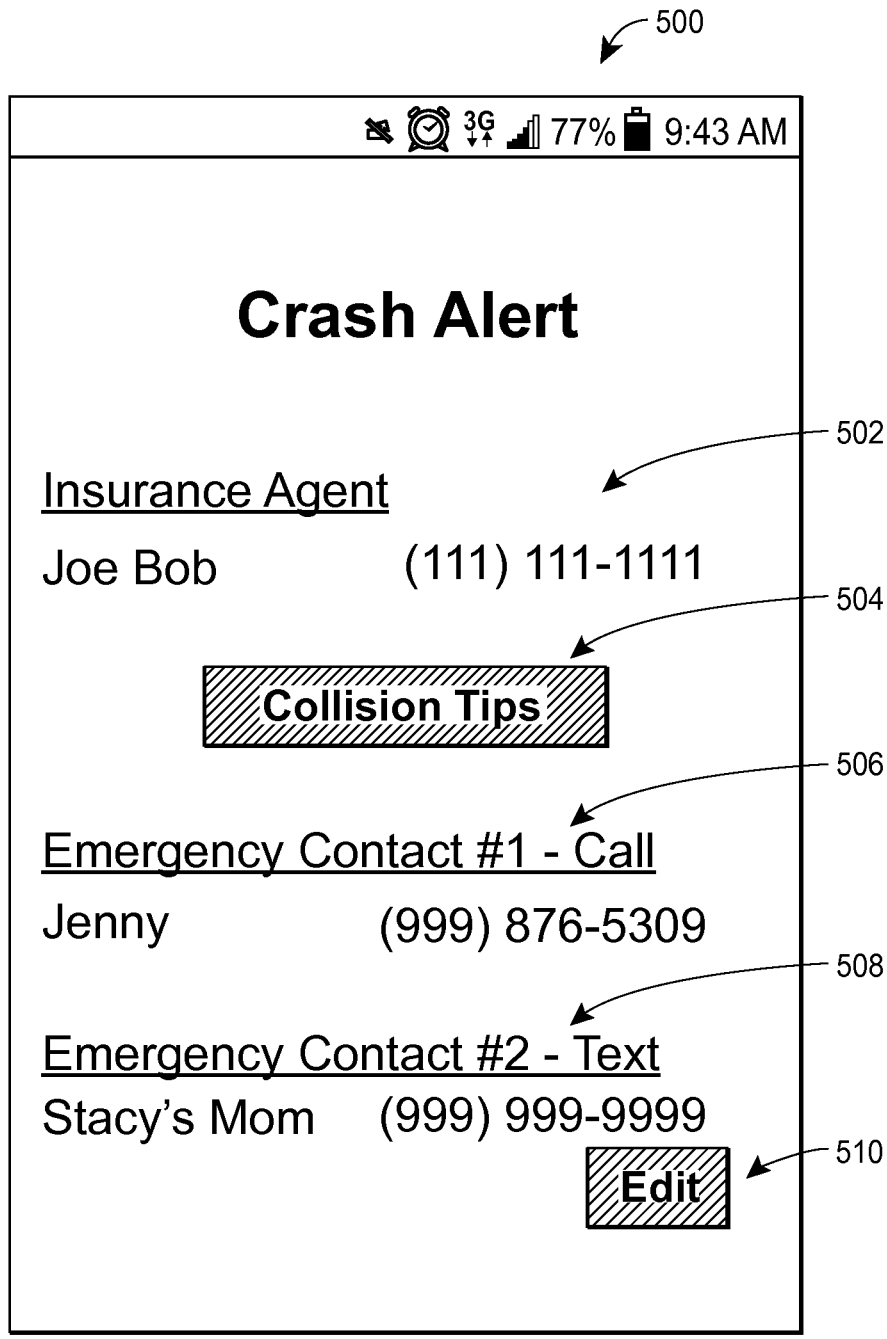
FIG. 5A illustrates an exemplary crash alert display in accordance with the presently described embodiments.
Figure 5B:
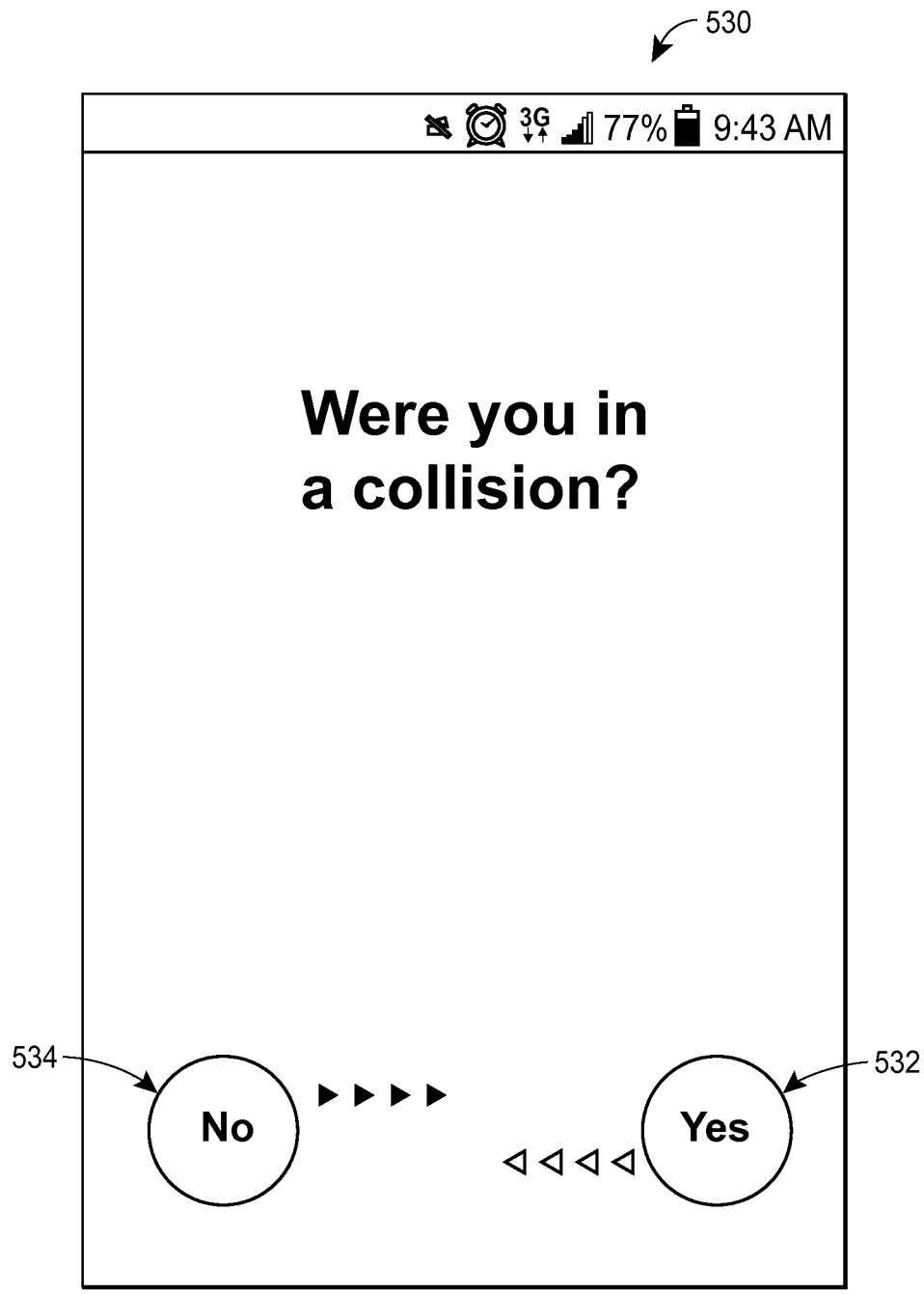
FIG. 5B illustrates an exemplary crash verification display in accordance with the presently described embodiments.
Figure 5C:
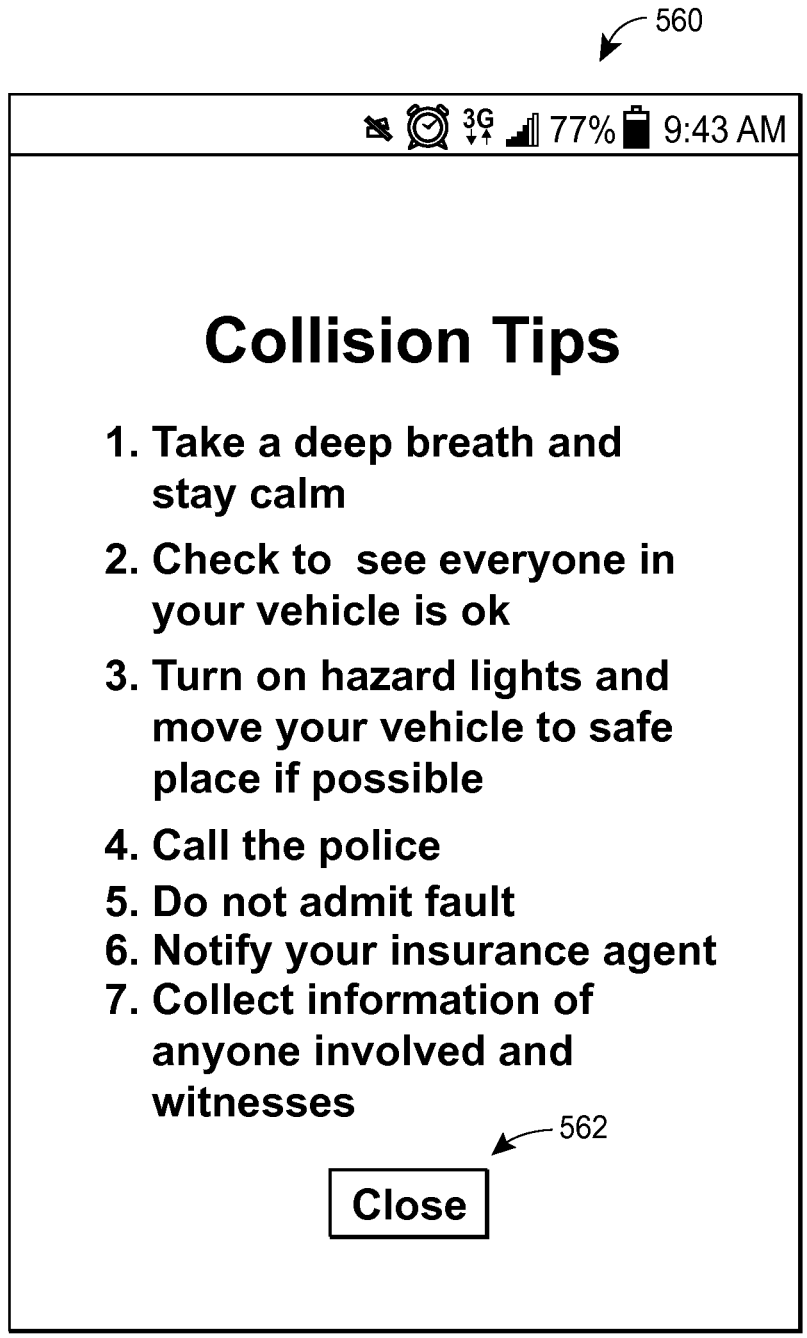
FIG. 5C illustrates an exemplary crash advice display of a client application in accordance with the presently described embodiments.

FIGS. 5A-C depict exemplary displays which may be generated by the collision identification server 102 and displayed by the client application 266 of the portable computing device 10 in response to identifying a vehicle collision. In other embodiments, the exemplary displays may be generated and displayed by the portable computing device 10. As will be appreciated by those of ordinary skill in the relevant art(s), the exemplary displays shown in FIGS. 5A-C are for illustrative purposes, and the associated functionality may be implemented using any suitable format and/or design for facilitating corresponding described functionalities without departing from the spirit and scope of the present disclosure. In some embodiments, the collision identification server may transmit web pages.

Before travelling in a vehicle, or at least before a vehicle collision is detected, the client application 266 may present an exemplary crash alert display 500 on the portable computing device for a user to enter emergency contacts who may receive a phone call, SMS text message, email, etc., when the user is involved in a vehicle collision. FIG. 5A depicts the exemplary crash alert display 500 which may include an indication 502 of a name and contact information of the user's insurance agent. The exemplary crash alert display 500 may also include an indication of a first emergency contact 506 including a name and contact information for the first emergency contact as well as an indication of a preferred method of communication with the emergency contact, such as call or text. Similarly, the exemplary crash alert display 500 may include an indication of a second emergency contact 508 including a name and contact information for the second emergency contact as well as an indication of a preferred method of communication with the emergency contact, such as call or text.

A user control 510 may be included for editing the insurance agent and emergency contact information, such as the names, contact information and/or preferred methods of communication. Additionally, the exemplary crash alert display 500 may include a user control 504 for receiving collision tips. When selected, the client application 266 may present a crash advice display as described in more detail below in FIG. 5C.

When the portable computing device 10 identifies a vehicle collision for example, via the collision assessment module 400 as shown in FIG. 4, a crash verification display may be presented to the user to verify whether the vehicle collision actually occurred. FIG. 5B depicts an exemplary crash verification display 530 which may include a collision request asking the user to verify that a vehicle collision occurred. The crash verification display 530 may also include a first user control 532, such as a "Yes" button, which when selected may indicate to the collision identification system that a vehicle collision actually occurred. Moreover, a second user control 534 may be included, such as a "No" button, which when selected may indicate to the collision identification system that the vehicle collision was incorrectly identified.

If the "No" button 534 is selected, the client application 266 may transmit the current set of sensor data to the training module 300 for further training, with an indication that the current set of sensor data does not correspond to a vehicle collision. Furthermore, the portable computing device 10 may continue to obtain current sets of sensor data for identifying vehicle collisions.

If the "Yes" button 532 is selected or if the user does not select either button within a predetermined amount of time (e.g., five minutes, seven minutes, etc.), the portable computing device 10 or the collision identification server 102 may transmit emergency notifications to the user's emergency contacts selected in the crash alert display 500 of FIG. 5A. For example, the portable computing device 10 may transmit a message to the collision identification server 102 indicating that the user has been in a vehicle collision. In turn, the collision identification server 102 may initiate a phone call with the user's first emergency contact, Jenny, according to the crash alert display 500 and may transmit an SMS text message to the user's second emergency contact, Stacy's Mom. In some embodiments, each emergency notification may include an indication that the user has been in a vehicle collision, the location of the user, the type and/or severity of the vehicle collision for example, as determined by the collision assessment module 400, an indication of whether the user responded to the alert, or any other suitable information.

In addition, the collision identification server 102 may initiate a phone call with the user to ask whether the user requires emergency assistance, and/or to receive any other additional information about the vehicle collision, such as the severity of the vehicle collision, the type of injuries to the user, the severity of the user's injuries, etc. If the user answers and indicates that she does not require emergency assistance, the portable computing device 10 may present the crash advice display to the user which may include collision tips. Otherwise, if the user indicates that she requires emergency assistance or does not respond to the phone call, the collision identification server 102 may transmit an additional emergency notification to emergency personnel, such as a police department, a fire department, paramedics, etc.

The additional emergency notification may include an indication that the user has been in a vehicle collision, an indication that the user requires emergency assistance, the location of the user, at least some of the information included in the current set of sensor data such as the maximum acceleration, the maximum change in speed, etc. The additional emergency notification may also include indications of the type of injuries to the user, the severity of the user's injuries, the type and/or severity of the vehicle collision for example, as determined by the collision assessment module 400, whether the user responded to the alert, or any other suitable information. In some embodiments, the client application 266 may also transmit the current set of sensor data to the training module 300 for further training, with an indication that the current set of sensor data corresponds to a vehicle collision.

As mentioned above, when the user selects the "Collision Tips" button 504 on the crash alert display 500 of FIG. 5A or if the user is in a vehicle collision and does not require emergency assistance, the client application 266 may present a crash advice display. FIG. 5C depicts an exemplary crash advice display 560 which may include several collision tips, such as "1. Take a deep breath and stay calm," "2. Check to see if everyone in your vehicle is ok," "3. Turn on hazard lights and move your vehicle to a safe place, if possible," "4. Call the police," "5. Do not admit fault," "6. Notify your insurance agent," and "7. Collect information of anyone involved and witnesses."

The collision tips may provide the user with helpful reminders and advice in a stressful situation when the user may not be thinking clearly. Furthermore, while the user may focus on the immediate impact of the collision, such as injuries to himself and to his passengers, the collision tips may provide the user with advice on notifying insurance agents, collecting information, not admitting fault, etc. This may increase the user's chances of recovery for damage to himself and to his vehicle and may decrease the user's chances of liability for damage to other vehicles, drivers, or passengers. While the crash advice display 560 includes seven collision tips, additional, fewer, or alternative collision tips may be included. The crash advice display 560 may also include a "Close" button 562 for closing the application.

In an exemplary scenario, John Doe may be travelling in his vehicle when he is rear-ended at high speeds by another vehicle causing him to slam his head into the steering wheel and temporarily lose consciousness. The sensors in his portable computing device 10 may detect a maximum acceleration of six G, which when compared to a statistical model may be indicative of a vehicle collision. As a result, John Doe's brother and wife may be notified of his location as well as the police department which may dispatch an ambulance and paramedics to take him from his vehicle and transport John Doe to the local hospital. In this manner, emergency personnel may be called upon immediately to respond to a serious accident without needing to be contacted by witnesses or the people involved in the accident.

Figure 6:
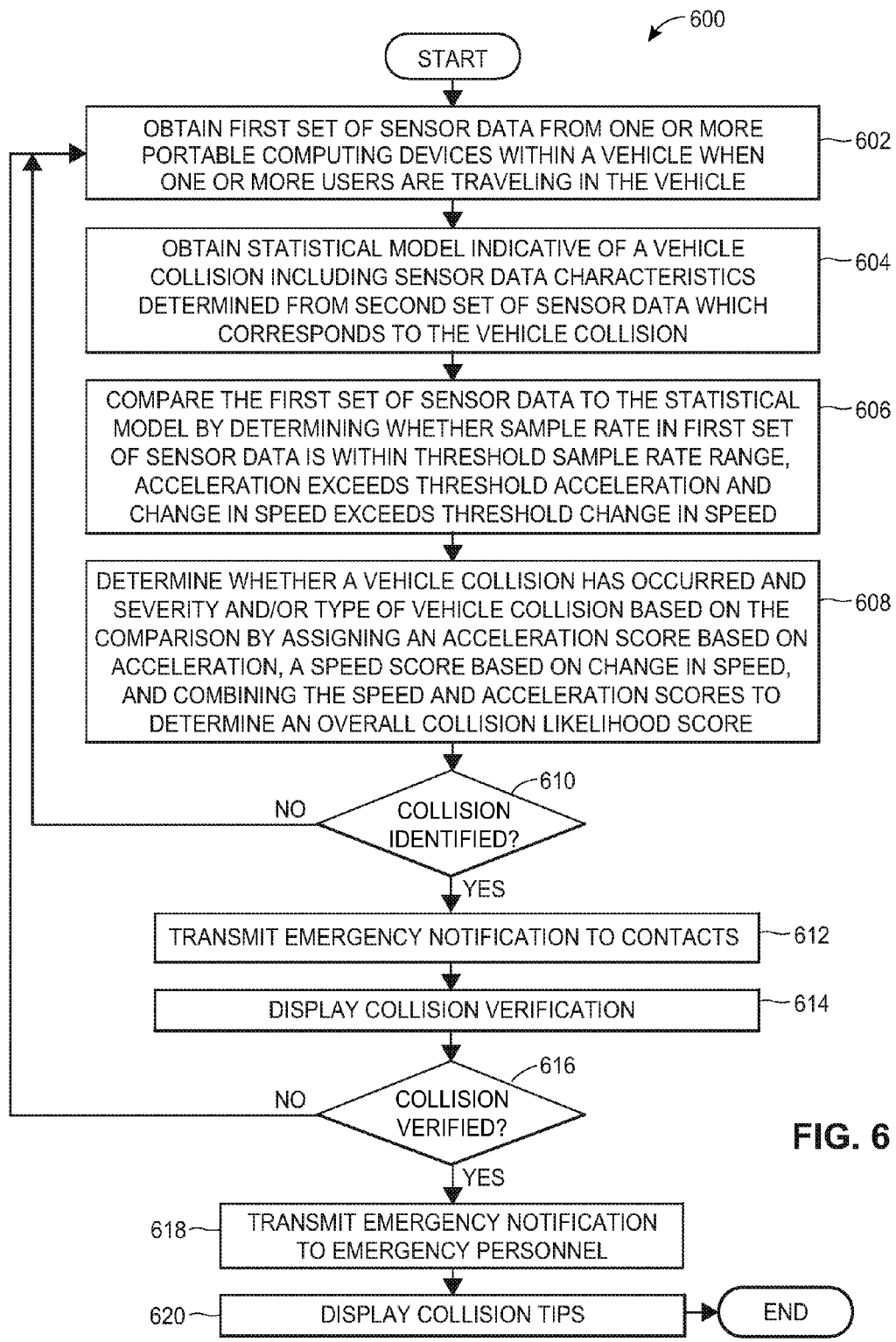
FIG. 6 illustrates a flow diagram representing an exemplary method for identifying vehicle collisions in accordance with the presently described embodiments.

FIG. 6 depicts a flow diagram representing an exemplary method 600 for identifying vehicle collisions. The method 600 may be executed on the portable computing device 10. In some embodiments, the method 600 may be implemented in a set of instructions stored on a non-transitory computer-readable memory and executable on one or more processors of the portable computing device 10. For example, the method 600 may be performed by the client application 266 and at least partially performed by the collision assessment module 400 as shown in FIG. 4. In other embodiments, the method 600 may be performed by the collision identification server 102 and/or a combination of the portable computing device 10 and the collision identification server 102.

In any event, at block 602, a current set of sensor data may be obtained in real-time or at least near real-time from the sensors in the portable computing device 10 when the portable computing device 10 is in a vehicle. For example, position and speed data may be obtained from the GPS unit 280, acceleration data may be obtained from the accelerometer 282, rotation data may be obtained from the gyroscope 284, pressure data may be obtained from the barometer, sound data may be obtained from the microphone, etc. In some embodiments, the collision identification system may determine that the portable computing device 10 is in a vehicle when the portable computing device 10 detects a speed over a predetermined threshold (e.g., 10 mph), and/or when the portable computing device 10 is within range of the vehicle head unit 14 (e.g., the portable computing device 10 detects an electronic signal from the vehicle head unit 14, such as a Bluetooth signal, Wi-Fi direct signal, USB, etc.).

In some embodiments, several current sets of sensor data may be obtained from several portable computing devices within the vehicle. For example, the current set of sensor data may be obtained from the sensors in the portable computing device 10 in addition to several other current sets of sensor data from sensors in passengers' portable computing devices. The current sets of sensor data may be combined in any suitable manner.

Additionally, the portable computing device 10 may obtain a statistical model indicative of a vehicle collision (block 604). In some embodiments, the statistical model may be generated and transmitted by a training module 300 in the collision identification server 102. The training module 300 may generate the statistical model based on statistical data indicative of a vehicle collision. In other embodiments, the training module 300 may be included in the portable computing device 10. The statistical model may be a set of rules including sensor data thresholds, such as sensor data characteristics which correspond to vehicle collisions. In other embodiments, the statistical model may be a decision tree, a graphical model, a regression model, or any other suitable type of statistical model which may be generated using machine learning techniques or by a user.

The statistical model may be compared to the current set of sensor data (block 606), and the portable computing device 10 may determine whether a vehicle collision occurred based on the comparison (block 608). For example, the portable computing device 10 may identify a maximum acceleration, a second highest acceleration, an average acceleration, a sample rate in which the acceleration is measured, a maximum change in speed, a maximum rotation, a maximum change in pressure, and a maximum sound intensity within the current set of sensor data. The statistical model may include sensor data characteristics which correspond to a vehicle collision or to a particular likelihood of a vehicle collision, such as a maximum acceleration above six G with a sample rate above 50 Hz which corresponds to a 99 percent likelihood of a vehicle collision. Based on the comparison to the current set of sensor data, the statistical model may indicate that there is a 95 percent likelihood a vehicle collision occurred. If the determined likelihood is above a predetermined likelihood threshold (e.g., 90 percent), the portable computing device 10 may identify a vehicle collision.

In some embodiments, the portable computing device 10 may reassess the determination of whether a vehicle collision occurred based on determinations and/or likelihoods received from other portable computing devices within the vehicle. For example, if the portable computing device 10 determines that a vehicle collision occurred, one passenger's portable computing device also determines that a vehicle collision occurred, and two passenger's portable computing devices determine that a vehicle collision did not occur, the portable computing device 10 may reassess its determination and may not identify a vehicle collision.

If a vehicle collision is not identified, the portable computing device 10 may continue to obtain current sets of sensor data in real-time or at least near real-time (block 602). On the other hand, if a vehicle collision is identified, an emergency notification may be transmitted to emergency contacts of the user (block 612), such as the emergency contacts selected in the crash alert display 500 as shown in FIG. 5A. In some embodiments, the portable computing device 10 may transmit the emergency notifications and/or the portable computing device 10 may cause the emergency notifications to be transmitted by for example, transmitting a request to the collision identification server 102 to transmit the emergency notifications. In any event, the emergency notifications may be in the form of an email, phone call, SMS text message, etc., and may include an indication that the user has been in a vehicle collision, the location of the user, the type and/or severity of the vehicle collision for example, as determined by the collision assessment module 400, an indication of whether the user responded to the alert, or any other suitable information.

Additionally, the portable computing device 10 may present a crash verification display to the user (block 614), such as the crash verification display 530 as shown in FIG. 5B. The crash verification display 530 may include a collision request asking the user to verify that a vehicle collision occurred, for example via a "Yes" button and a "No" button. If the user selects the "No" button indicating that a vehicle collision did not occur, the portable computing device 10 may transmit the current set of sensor data to the training module 300 for further training, with an indication that the current set of sensor data does not correspond to a vehicle collision. Moreover, the portable computing device 10 may continue to obtain current sets of sensor data in real-time or at least near real-time (block 602).

If the user selects the "Yes" button indicating that a vehicle collision occurred or the user does not respond to the request, the portable computing device 10 may receive a phone call asking whether the user requires emergency assistance. If the user does not answer the phone call or indicates that he requires emergency assistance, an additional emergency notification may be transmitted to emergency personnel (block 618), such as the police department, the fire department, the paramedics, etc. In some embodiments, the portable computing device 10 may transmit the additional emergency notification and/or the portable computing device 10 may cause the additional emergency notification to be transmitted by for example, transmitting a request to the collision identification server 102 to transmit the additional emergency notification.

In any event, the additional emergency notification may include an indication that the user has been in a vehicle collision, an indication that the user requires emergency assistance, the location of the user, at least some of the information included in the current set of sensor data such as the maximum acceleration, the maximum change in speed, etc. The additional emergency notification may also include indications of the type of injuries to the user, the severity of the user's injuries, the type and/or severity of the vehicle collision for example, as determined by the collision assessment module 400, whether the user responded to the alert, or any other suitable information.

The portable computing device 10 may also present a crash advice display to the user (block 620), such as the crash advice display 560 as shown in FIG. 5C with collision tips on how to proceed after the vehicle collision. In some embodiments, the portable computing device 10 may transmit the current set of sensor data to the training module 300 for further training, with an indication that the current set of sensor data corresponds to a vehicle collision.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A computer-implemented method for automatically identifying vehicle collisions using sensor data, the method executed by one or more processors programmed to perform the method, the method comprising:

sensing, at one or more sensors communicatively coupled to a portable computing device, information about the portable computing device;

obtaining, at the one or more processors, sensor data from the one or more sensors communicatively coupled to the portable computing device, wherein a user of the portable device is travelling in a vehicle;

obtaining, at the one or more processors, statistical data indicative of a vehicle collision including one or more sensor data characteristics which correspond to the vehicle collision, wherein the one or more sensor data characteristics includes a plurality of threshold sample rate ranges at which acceleration is measured and a different threshold acceleration corresponding to each of the plurality of threshold sample rate ranges;

comparing, by the one or more processors, the obtained sensor data from the one or more sensors to the statistical data indicative of the vehicle collision including:

identifying, by the one or more processors, one of the plurality of threshold sample rate ranges corresponding to a sample rate included in the obtained sensor data; and determining, by the one or more processors, whether an acceleration included in the obtained sensor data exceeds the threshold acceleration corresponding to the identified threshold sample rate range; and when the acceleration included in the obtained sensor data exceeds the threshold acceleration corresponding to the identified threshold sample rate range, determining, by the one or more processors, that a collision has occurred involving the vehicle based on the comparison.

2. The method of claim 1, further comprising:

causing, by the one or more processors, an emergency notification to be transmitted to one or more emergency contacts for the user.

3. The method of claim 1, further comprising:

causing, by the one or more processors, a collision request to be displayed on the portable computing device asking the user to verify that a vehicle collision occurred; and in response to receiving an indication from the user that the collision occurred or when the user does not respond within a predetermined amount of time, causing, by the one or more processors, an emergency notification to be transmitted to emergency personnel, wherein the emergency notification includes a location of the user and at least some of the sensor data.

4. The method of claim 1, wherein the obtained sensor data is a first set of sensor data and wherein obtaining statistical data indicative of a vehicle collision includes, during a training period:
obtaining, at the one or more processors, a plurality of second sets of sensor data, wherein at least one of the plurality of second sets of sensor data corresponds to the vehicle collision and wherein at least one of the plurality of second sets of sensor data does not correspond to the vehicle collision; and
determining, by the one or more processors, one or more sensor data characteristics of the at least one second set of sensor data which correspond to the vehicle collision.

5. The method of claim 1, wherein the sensor data includes at least one of speed data, position data, or rotation data, and the one or more sensor data characteristics include at least one of: a threshold change in speed or a threshold rotation.

6. The method of claim 1, wherein the one or more sensor data characteristics includes a threshold change in speed and when the acceleration included in the obtained sensor data does not exceed the threshold acceleration:
determining, by the one or more processors, whether a change in speed included in the obtained sensor data exceeds the threshold change in speed; and
when the change in speed included in the obtained sensor data exceeds the threshold change in speed, determining, by the one or more processors, whether a collision has occurred involving the vehicle based on the acceleration and the change in speed.

7. The method of claim 6, wherein determining whether a collision has occurred based on the acceleration and the change in speed includes:
assigning, by the one or more processors, an acceleration score based on the acceleration and the sample rate;
assigning, by the one or more processors, a speed score based on the change in speed;
combining, by the one or more processors, the acceleration score and the speed score into an overall collision likelihood score;
determining, by the one or more processors, whether the overall collision likelihood score exceeds a threshold collision score; and
when the overall collision likelihood score exceeds the threshold collision score, determining, by the one or more processors, that a collision has occurred involving the vehicle.

8. The method of claim 1, further comprising:
obtaining sensor data from a plurality of sets of sensors corresponding to a plurality of portable computing devices, wherein a plurality of users of the plurality of portable computing devices are travelling in the vehicle;
for each set of sensor data, comparing the obtained sensor data to the statistical data indicative of the vehicle collision; and
determining that a collision has occurred involving the vehicle based on the comparison.

9. The method of claim 1, further comprising:
determining, by the one or more processors, at least one of (i) a severity of the vehicle collision or (ii) a type of the vehicle collision based on the comparison of the obtained sensor data to the statistical data.

10. A portable computing device for automatically identifying vehicle collisions using sensor data, the portable computing device comprising:
one or more processors;
one or more sensors for receiving sensor data including at least one of: acceleration data, speed data, position data, or rotation data; and
a non-transitory computer-readable memory coupled to the one or more processors, and the one or more sensors, and storing thereon instructions that, when executed by the one or more processors, cause the portable computing device to:
obtain the sensor data from the one or more sensors, wherein a user of the portable computing device is travelling in a vehicle;
obtain statistical data indicative of a vehicle collision including one or more sensor data characteristics which correspond to the vehicle collision, wherein the one or more sensor data characteristics includes a plurality of threshold sample rate ranges at which acceleration is measured and a different threshold acceleration corresponding to each of the plurality of threshold sample rate ranges;
compare the obtained sensor data from the one or more sensors to the statistical data indicative of the vehicle collision including:
identifying one of the plurality of threshold sample rate ranges corresponding to a sample rate included in the obtained sensor data; and
determining whether an acceleration included in the obtained sensor data exceeds the threshold acceleration corresponding to the identified threshold sample rate range; and
when the acceleration included in the obtained sensor data exceeds the threshold acceleration corresponding to the identified threshold sample rate range, determine that a collision has occurred involving the vehicle based on the comparison.

11. The portable computing device of claim 10, wherein the instructions further cause the portable computing device to transmit an emergency notification to one or more emergency contacts for the user.

12. The portable computing device of claim 10, further comprising a user interface, wherein the instructions further cause the portable computing device to:
cause a collision request to be displayed on the user interface asking the user to verify that a vehicle collision occurred; and
in response to receiving an indication from the user that the collision occurred or when the user does not respond within a predetermined amount of time, transmit an emergency notification to emergency personnel, wherein the emergency notification includes a location of the user and at least some of the sensor data.

13. The portable computing device of claim 10, wherein the obtained sensor data is a first set of sensor data and to obtain statistical data indicative of a vehicle collision, the instructions cause the portable computing device to, during a training period:
obtain a plurality of second sets of sensor data, wherein at least one of the plurality of second sets of sensor data corresponds to the vehicle collision and wherein at least one of the plurality of second sets of sensor data does not correspond to the vehicle collision; and determine one or more sensor data characteristics of the at least one second set of sensor data which correspond to the vehicle collision.

14. The method of claim 10, wherein the one or more sensor data characteristics include at least one of: a threshold change in speed or a threshold rotation.

15. The portable computing device of claim 10, wherein the one or more sensor data characteristics includes a threshold change in speed and when the acceleration included in the obtained sensor data does not exceed the threshold acceleration, the instructions cause the portable computing device to:

determine whether a change in speed included in the obtained sensor data exceeds the threshold change in speed; and when the change in speed included in the obtained sensor data exceeds the threshold change in speed, determine whether a collision has occurred involving the vehicle based on the acceleration and the change in speed.

16. The portable computing device of claim 15, wherein to determine whether a collision has occurred based on the acceleration and the change in speed, the instructions cause the portable computing device to:

assign an acceleration score based on the acceleration and the sample rate;

assign a speed score based on the change in speed;

combine the acceleration score and the speed score into an overall collision likelihood score;

determine whether the overall collision likelihood score exceeds a threshold collision score; and when the overall collision likelihood score exceeds the threshold collision score, determine that a collision has occurred involving the vehicle.

17. The portable computing device of claim 10, wherein the instructions further cause the portable computing device to:

obtain sensor data from a plurality of sets of sensors corresponding to a plurality of portable computing devices, wherein a plurality of users of the plurality of portable computing devices are travelling in the vehicle;

for each set of sensor data, compare the obtained sensor data to the statistical data indicative of the vehicle collision; and determine that a collision has occurred involving the vehicle based on the comparison.

18. The portable computing device of claim 10, wherein the instructions further cause the portable computing device to:

determine at least one of (i) a severity of the vehicle collision or (ii) a type of the vehicle collision based on the comparison of the obtained sensor data to the statistical data.

* * * * *